A. M. JOHNSON.
ANIMAL HOLDER.
APPLICATION FILED MAR. 28, 1917.

1,232,556.

Patented July 10, 1917.
2 SHEETS—SHEET 1.

Inventor
A. M. Johnson

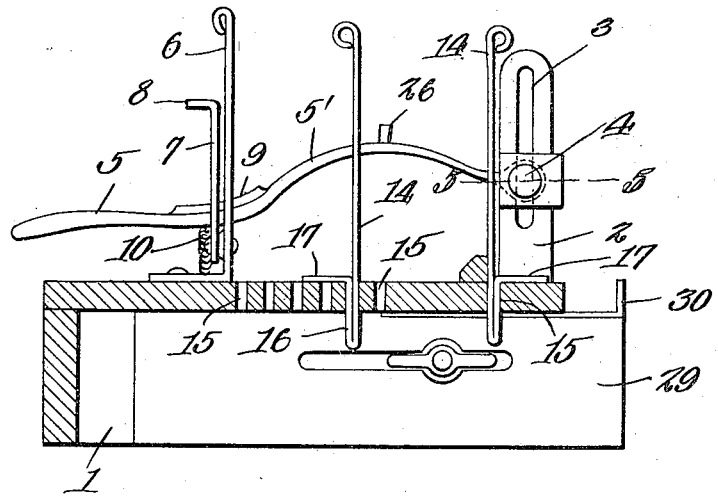

UNITED STATES PATENT OFFICE.

ARLEY M. JOHNSON, OF BELLE CENTER, OHIO.

ANIMAL-HOLDER.

1,232,556.  Specification of Letters Patent.  Patented July 10, 1917.

Application filed March 28, 1917. Serial No. 157,988.

*To all whom it may concern:*

Be it known that I, ARLEY M. JOHNSON, a citizen of the United States, residing at Belle Center, in the county of Logan and State of Ohio, have invented a new and useful Animal-Holder, of which the following is a specification.

This invention relates to tables for use in operating on hogs, sheep and other live stock, one object of the invention being to provide an operating table having improved means for holding animals in position to be operated on readily. Another object is to provide apparatus which can hold securely animals of different sizes.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings, the preferred form of the invention has been shown.

In said drawings:

Fig. 3 is a section on the line 3—3 of Fig. 1;

Fig. 4 is a section on the line 4—4 of Fig. 1;

Fig. 5 is a sectional view taken on the line 5—5 of Fig. 3 of the means used in adjusting the apparatus to the neck of an animal.

Figures 1, 2:
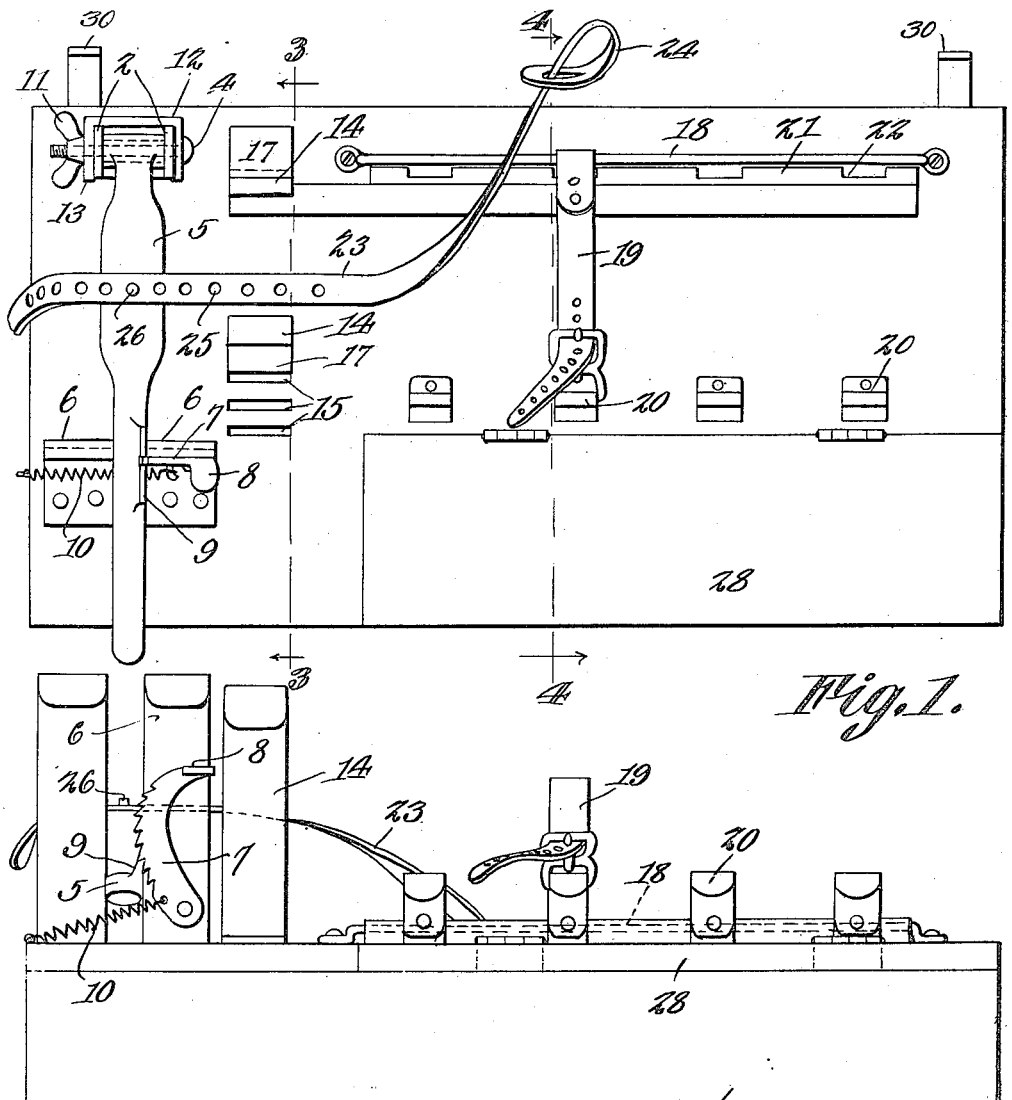
Figure 1 is a top plan view of the invention.
Fig. 2 is a side elevation.

In the drawing, 1 indicates a base provided on one edge adjacent the end thereof with vertical parallel bearing members 2 having elongated slots 3 within which are slidably mounted the ends of a stub shaft 4. The shaft 4 is provided with a bushing between bearing members 2 upon which is mounted a retaining arm 5 bowed intermediate its ends as at 5' for snug engagement with the neck of an animal. Spaced standards 6 are mounted opposite the bearing members 2 for reception therebetween of the free end of the arm 5 and a curved rack 7 provided with a lateral extension 8 is pivotally carried upon one of the standards 6 for engagement with a flange 9 upon one side of the arm 5 to hold the arm when adjusted to the animal. A coil spring 10 holds the rack 7 normally in engagement with the arm. Further adjustment of the arm 5 is made by movement of the shaft 4 within slots 3, such movement being limited by a wing nut 11 mounted upon an end of the shaft for binding engagement with one of the bearings 2. A stop 12 is designed to restrict the rotation of the arm 5 and is secured to the shaft exteriorly of the bearing members through openings formed in parallel opposed flanges 13.

Opposed vertical body supports 14 carried within slots 15 formed in the base are provided with portions bent over upon themselves as at 16, and outwardly as at 17 to form foot flanges for holding the supports upright and limiting downward movement thereof within the slots. Adjustment of the supports, with respect to each other, is effected by mounting them in various slots 15.

Secured adjacent to and parallel with one edge of the base is a rod 18 upon which is slidably mounted a strap 19 having a buckle provided with an eye for engagement with any one of a series of alined hooks 20 upon the base 1.

In operation an animal to be treated is placed upon the base 1 with its neck between bearing members 2 and standards 6. The arm 5 is then adjusted at its pivot end and brought down across the neck of the animal, where it is held by the rack 7. The supports 14 are positioned against the body of the animal and the strap 19 slid to a position slightly in advance of the hind legs where the buckle is hooked to one of the eyes 20 and held from further sliding movement by engagement with the walls of the notches 22. The noose 24 of the strap 23 is then placed upon one of the hind legs, which is drawn to any desired position where it is held by engagement with pin 25 on arm 5.

An angle bar 21 is secured adjacent to and parallel with said rod 18 and has notches 22 directly opposite the hooks 20 and into which project the looped ends of straps 19 which are thus retained against sliding movement.

A leg strap 23 having a noose 24 formed at one end and alined spaced openings 25 formed in the other end, is secured to the arm 5 by means of a pin 26.

A receptacle 27 disposed interiorly of the base is provided with a cover 28 and is for storing the various parts comprising the invention. Slidably mounted arms 29 are provided with fingers 30 for hanging up the device as an entirety when it is not in use.

What is claimed is:

1. An animal holder, comprising a base provided with slots, standards rising from the base, a neck engaging bar mounted between the standards, means for securing the bar to confine the neck of an animal, body engaging standards detachably secured in the slots, a rod extending longitudinally of the base, spaced hooks secured to the base, a strap sliding on the rod, and a buckle adapted to detachably engage the hooks and the strap to secure the strap about the body of an animal.

2. An animal holder, comprising a base provided with slots, a neck engaging bar secured on the base, body engaging standards detachably mounted in the slots, a bar extending longitudinally of the base, an angle bar secured to the base adjacent and parallel with the longitudinal bar, said angle bar provided with notches, hooks secured to the base, a strap sliding on the longitudinal bar and adapted to enter the notches, a buckle adapted to detachably engage the hooks and strap to secure the body of an animal, and means for securing the legs of an animal.

In testimony that I claim the foregoing as my own, I have hereto affixed my signature in the presence of two witnesses.

ARLEY M. JOHNSON.

Witnesses:
W. B. RAMSEY,
F. E. STEPHENSON.

Copies of this patent may be obtained for five cents each, by addressing the "Commissioner of Patents, Washington, D. C."